United States Patent [19]
Tobey et al.

[11] 3,889,548
[45] June 17, 1975

[54] CHANNELING CONVEYOR

[75] Inventors: Hubert E. Tobey, Milltown; John W. Hood, East Brunswick; Dee L. Irvin, Moonachie, all of N.J.

[73] Assignee: International Telephone and Telegraph Corporation, Nutley, N.J.

[22] Filed: July 16, 1973

[21] Appl. No.: 379,868

Related U.S. Application Data

[62] Division of Ser. No. 248,570, April 28, 1972.

[52] U.S. Cl. .................................................. 74/395
[51] Int. Cl. ............................................ F16h 35/06
[58] Field of Search ...... 74/242.1 A, 242.11 A, 401, 74/395

[56] References Cited
UNITED STATES PATENTS

| | | | |
|---|---|---|---|
| 1,575,655 | 3/1926 | Stinson | 74/242.1 A |
| 1,582,516 | 4/1926 | Gibson | 74/242.1 A |
| 1,892,067 | 12/1932 | McMillan | 74/242.1 A |
| 3,496,918 | 2/1970 | Finlay | 74/242.11 R X |

*Primary Examiner*—Leonard H. Gerin
*Attorney, Agent, or Firm*—John T. O'Halloran; Menotti J. Lombardi, Jr.

[57] ABSTRACT

A speed control means having a first input speed pulley, a second output speed pulley, and a timing belt engaging the pulleys in a closed loop. Tension pulleys are adjustably positioned and engage the timing belt, one interior and one exterior of the loop. Adjustment of the tension pulleys in one direction causes the second pulley to move faster than the first pulley, and adjustment of the tension pulleys in an opposite direction causes the second pulley to move slower than the first pulley.

3 Claims, 4 Drawing Figures

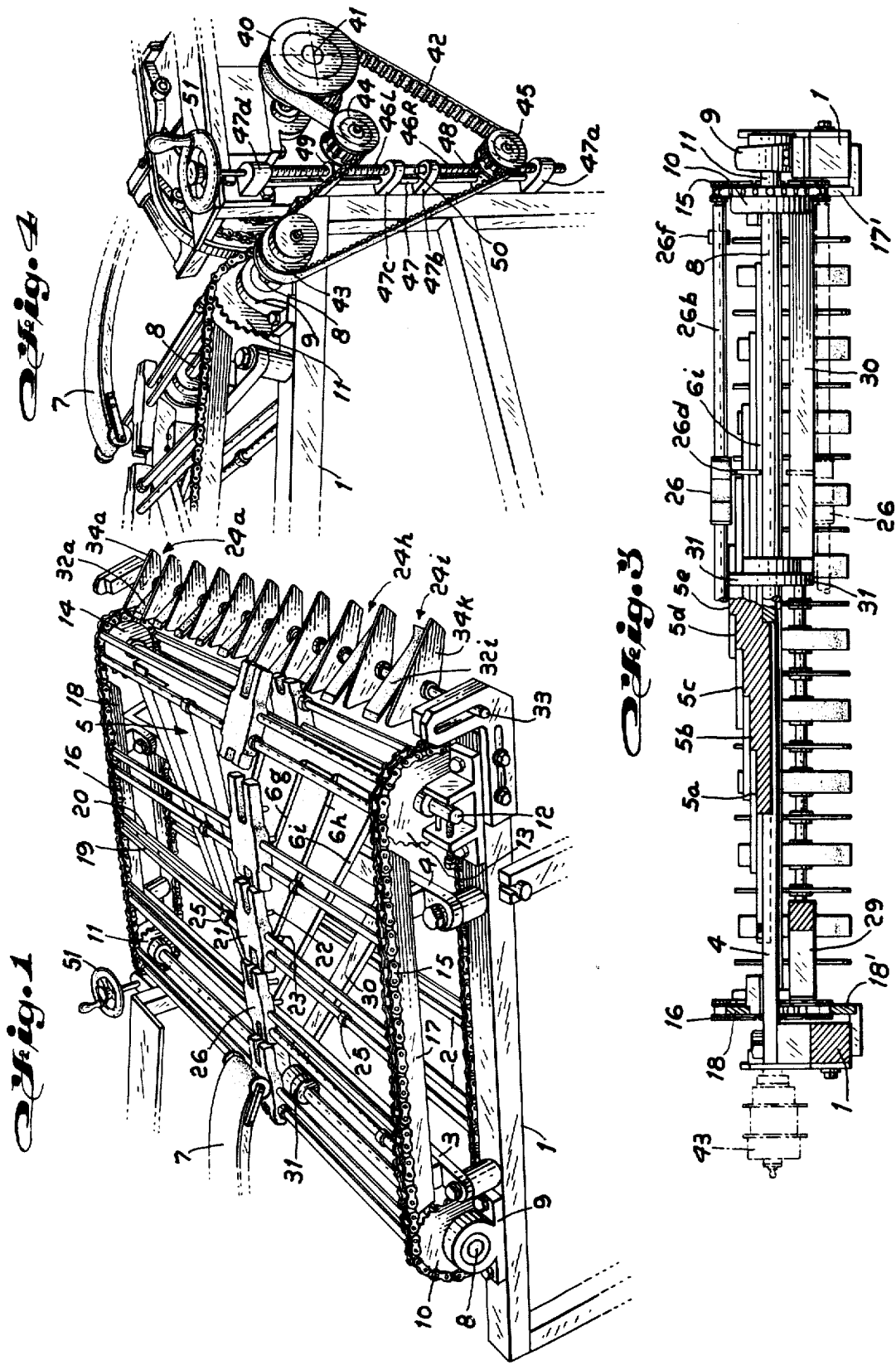

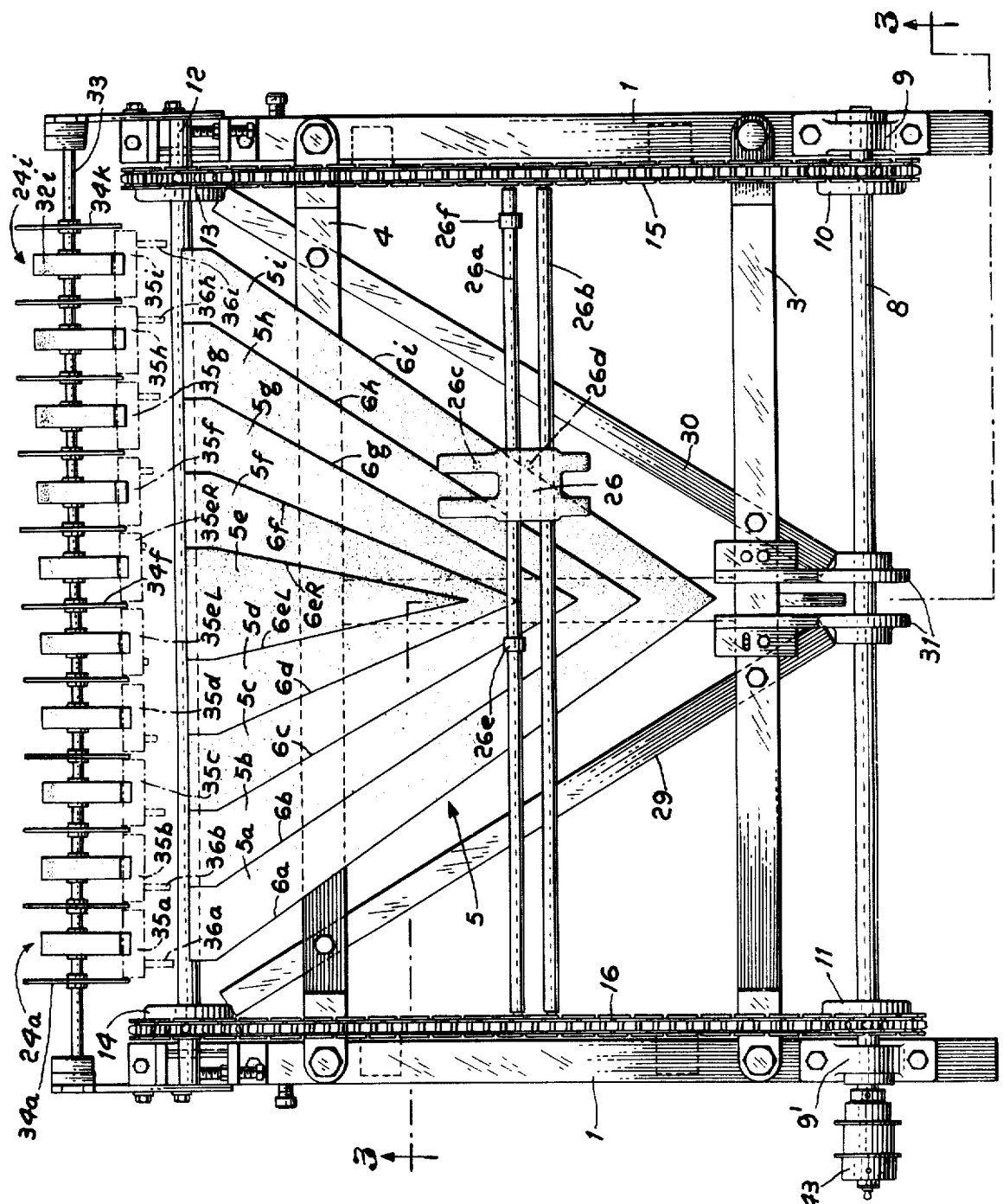

CHANNELING CONVEYOR

This is a division, of application Ser. No. 248,570, filed Apr. 28, 1972.

CROSS REFERENCE TO RELATED APPLICATION

This application is related to the copending application of H. E. Tobey et al Oct. 3, 1972, Ser. No. 248,319, filed Apr. 27, 1972, and now U.S. Pat. No. 3,782,271, issued Jan. 1, 1974. The assignee of the instant application is the same as that in the referenced application. Insofar as the referenced application is necessary for an understanding of the overall operation of this invention it is incorporated by reference herein.

BACKGROUND OF THE INVENTION

In general this invention relates to a conveying device, and more particularly to a channel conveying device in which items centrally coupled to the input of the conveyor in single file, are dispensed at the conveyor output in a sequential channeling manner across the width of the conveyor.

As described in the foregoing cross referenced application, the channeling conveyor is positioned in an in-line system and adapted to transfer pies produced by the pie forming apparatus to the cooking arrangement. In other words, the channeling conveyor required according to the invention must be designed to handle pies produced by the forming apparatus and received in a single line fashion on the order of 80 pieces per minute, and able to dispense these pies to a fryer type cooker, such that the pies are lined in an oblique file across the width of the fryer rather than in single in-line fashion. This is necessary in order that the most economical use may be made of the fryer by having the pies grouped in a line while being cooked, rather than in a single line fashion one at a time.

The channeling conveyor's value as a pie channeling conveyor for the apparatus disclosed in the cross referenced application will be clearly evident by reading the following description of the preferred embodiment, but in addition other uses for this conveyor will be readily appreciated by those skilled in the art who desire to variously position items traveling in a single line for handling by automatic equipment.

SUMMARY OF THE INVENTION

It is therefore an object of this invention to provide a channeling conveyor in which items received in a single line manner are conveyed across the width of the conveyor in a continuous channeling manner.

Another object of the invention is to provide a channeling conveyor which meets the requirements for use with automatic pie apparatus.

A further object of the invention is to provide a timing device to time the operation of the channeling conveyor to that of the received items to be conveyed.

According to the broader aspects of the invention there is provided a conveying means including a frame mounted cam track bed having V-shaped pyramiding stepped camming surfaces, a plurality of plaks mounted to move in a continuous loop about said track bed in a direction corresponding to said V-shaped surfaces, and each of the plaks having a pair of pins positioned therein, one pin following the side of a selected one camming surface and the other pin riding on said one surface, whereby the plaks dispense items in a continuous serial manner across the output of said track bed.

According to a feature of the invention a speed control means is coupled between a drive shaft of said channeling conveyor and a drive arrangement of the input means to said conveyor, such that the speed of the plaks is controlled to match the input speed of the items to be conveyed.

BRIEF DESCRIPTION OF THE DRAWINGS

In addition to the foregoing, other objects and features of the invention will become apparent if reference is made to the description of the preferred embodiment read in conjunction with the following drawings, in which:

FIG. 1 is a perspective view of the channeling conveyor according to the invention;

FIG. 2 is a top view of the channeling conveyor according to the invention;

FIG. 3 is a partial cross sectional view and end view of the conveyor illustrated in FIG. 2; and FIG. 4 illustrates the speed control drive according to the invention.

DESCRIPTION OF THE PREFERRED EMBODIMENT

Referring now to FIG. 1 the channeling conveyor according to the invention is illustrated in a perspective view. The frame 1 having cross ribs 2 has mounted thereon two support members 3,4. The support members 3,4 have mounted thereon a cam track bed 5. The cam track bed 5 has cam follower sides $6a-i$ which are stepped in pyramiding fashion and V-shaped, with the apex of the V-shaped cams adjacent the input conveyor 7 which deposits the items to be conveyed onto the channeling conveyor.

Drive shaft 8 is rotatably mounted to the frame 1 by means 9,9' (9' not shown) and has fixed thereto sprocket wheels 10,11. Shaft 12 is fixed to the frame 1 and has rotatably mounted thereon sprocket wheels 13,14. A link chain carrier 15,16 is positioned to move in a continuous loop about the sprocket wheels, and is supported by chain guides 17,18 in its movement about the sprocket wheels. Mounted to the chain is a pair of rods 19, 20 on which is slidably mounted a plak 21. The plak 21 has fixed therein a forward pin 22 and a rearward pin 23. The rearward pin 23 is longer than the forward pin 21 and acts as a cam follower to the cam follower sides 6 of the cam track bed. The forward pin 22 acts as a support means for the item to be carried by the plak 21.

As shown, the cam follower pin 23 of the plak 21 will follow the stepped side 6h to deliver the item to position 24h. The lateral movement of the plak 21 is controlled by collars 25 which insures that the cam follower pins 23 engage the side 6h and follows the V-shaped cam track to the desired channel output portion 24h. The following plak 26 then follows the next cam track side 6i and will deposit an item into position 24i. The plaks are returned in a continuous loop and with the aid of the lower guides 29,30, and entrance guide 31 will continue to move in a loop and engage the associated cam tracks. Each position 24 of the output receiving means comprises a rotatably mounted drop guide $32a-i$ mounted on a shaft 33. The drop guides 32 are flanked by drop guide sides $34a-k$, and positioned to catch from the plaks the items and guide them to a following conveyor as illustrated in the cross referenced application. These output receiving means as shown comprise ten positions, whereas any number of positions are possible depending on the number of plaks and cam tracks to provide an accurate channeling of the received items.

Referring now to FIG. 2, a top view of the arrangement of FIG. 1 is illustrated. As illustrated in this figure the frame 1 and support members 3,4 mount the V-shaped cam track bed 5 with the apex of the V-shaped adjacent the input guide 31, and in addition return guide means 29,30. The return guide means assist the return of the plaks by moving the plaks to the center of entrance guide 31 rotating the shaft 8. The guide 31 aids in centering and return of the plaks from the under to the over portions of the loop. Only the last plak 26 for channeling the item into position 24i is illustrated. Plak 26 is slidably mounted on the two rods 26a,26b. The H-shaped plak is made of a plastic type material and inserted in the right hand side are two pins 26c, 26d. The pin 26d follows the cam follower side 6i to guide the plak into the 24i position to deposit the carried item onto the drop guide 32i. The forward pin 26c rides on top of the adjacent surface 5i of the cam track bed. The collar 26e prevents the plak 26 from engaging the left side of the V-shaped track bed and forces the cam follower pin 26d to follow the side 6i of the V-shaped cam. The collar 26f also insures that the plak's lateral movement is limited and return guide means 30 insures that the plak 26 in the return loop is centered onto the entrance guide 31 to begin a new cycle.

A ten track bed 5 is illustrated having nine V-shaped pyramiding stepped surfaces 5a–5i. Surfaces 5a,b,c,d are the mirror image of surfaces of 5f,g,h,i, and the surface 5e sides control the position of the two middle plaks. As illustrated in the dashed lines, the plaks 35a–35el to the left of drop guide side 34f are the mirror image of the plaks 35er–35i to the right of side 34f. The pin 36a–i heights are proportional to the stepping of the ten track bed surfaces 5a–i. A drive belt pulley 43 is mounted on drive shaft 11 and determines the speed of the plaks moving in the continuous loop.

Referring now to FIG. 3 the partial cross sectional view and end view of FIG. 2 is illustrated. The shaft 11 is rotatably mounted by means 9 in frame 1, and has positioned thereon a sprocket wheel drive 10 for moving the chain 15 in the continuous loop. The cross sectional view shows the cam track bed 5 pyramiding stepped surfaces 5a,5b,5c,5d,5e. The rod mounted plak 26 follows the V-shaped cam track side by pin 26d within the limits established by collars 26e,26f. The return guide 30 assists the return of plak 26 (illustrated in dashed lines), to the entrace guide 31. The chain drive is supported in the loop by chain guides 17',18,18' illustrated in this figure.

Referring now to FIG. 4, the speed control drive coupled to the drive shaft 11 will be described. The pulley 40 mounted to drive shaft 41 is moving at the same speed as the conveyor 7 which is dispensing the items from the pie molding apparatus, as disclosed in the referenced application, onto the plaks. Shaft 46 has a right hand thread section 46R and a left hand thread section 46L. Traveling nut 48 is located on the right hand thread section, and traveling nut 49 is located on the left hand thread section. The shaft 46 is coupled together by a slotted slip collar 50. The drive belt 42 tension is preset by raising collar 50 to disengage the lower section 46R of screw shaft 46. Hand wheel 51 is coupled to shaft 46L and is turned to the right or to the left to adjust the belt tension. After the belt tension has been set, collar 50 is dropped into the locked position. In the locked position, both the right hand thread section 46R and the left hand thread section 46L of shaft 46 turn when the hand wheel 51 is turned. By turning the hand wheel 51 to the right or clockwise, the traveling nut 48 moves upward and the traveling nut 49 moves downward. Both move at the same speed, so as not to change the belt tension. Turning the hand wheel 51 clockwise gives a retarding action to shaft 8 in relation to shaft 41. Turning the hand wheel 51 counterclockwise gives an advancing action to shaft 8 in relation to shaft 41. This timing arrangement permits quick and precise timing between the input conveyor 7 and the plaks on the channeling conveyor. All pulleys 40,43,44,45 are timing belt pulleys, and shaft 47, mounted by mounting means 47a–d, is a guide shaft for traveling nuts parts 48 and 49.

In the foregoing, there was described a channeling conveyor adapted for conveying, in a preferred embodiment, pies received from an input conveyor to a plurality of output receiving means positioned across the width of the channeling conveyor, each position receiving a dispensed pie in a sequential manner. A plurality of rod mounted plaks are moved in a continuous loop and a V-shaped cam track bed is positioned within the loop. The cam track bed has a number of stepped pyramiding V-shaped camming surfaces on its top face and oriented with the apex of the V-shaped surfaces adjacent the input conveyor. Cam follower pins are selectively sized and located in the plaks for following predetermined sides of the V-shaped track bed. Collars selectively positioned on the rods to prevent transversal movement of the individual plaks, except within predetermined limits. A means to control the speed of the plaks is coupled to the drive shaft of said conveyor to coordinate the speed of the items inputed to the conveyor with the movement of the plaks. The pie channeling conveyor arrangement enables the pie items to be delivered and sequentially dispensed at its output across its width for utilization by a following coupled conveying system.

While we have described above the principles of our invention in connection with specific apparatus, it is to be clearly understood that this description is made only by way of example and not as a limitation to the scope of our invention as set forth in the objects thereof and in the accompanying claims.

We claim:

1. Speed control means comprising in combination:

an input speed pulley;

an output speed pulley;

a timing belt engaging said input and output pulleys within a closed loop;

a shaft having a right hand thread portion and a left hand thread portion;

first means for mounting a first tension pulley on said right hand portion and second means for mounting a second tension pulley to said left hand portions;

means mounting said shaft and detachably coupling said right and left portions, so that said first pulley engages said timing belt within said closed loop, and said second tension pulley engages said timing belt outside said closed loop; and means for selectively turning said shaft to cause said first and second means to move axially toward each other and said output speed pulley to move faster than said input speed pulley when said shaft is moved in a first direction, and slower when said shaft is moved in a second direction and said first and second means to move axially away from each other.

2. The combination of claim 1 wherein said first and second means are first and second traveling nuts slidably mounted on said shaft mounting means and positioned to engage said right and left thread portions, respectively.

3. The combination of claim 2 including a slotted slip collar coupling said right and left hand thread portions together to cause said traveling nuts to move at the same speed, and said collar disengaging said shafts to enable adjusting of said belt tension.

* * * * *